May 27 1924.  H. ST. PIERRE  1,495,361

ANTISKID DEVICE

Filed Oct. 27, 1921

Witness
W. A. Blanchard.

Inventor:
Henry Saint Pierre
By Soulegal Southgate
Attorneys.

Patented May 27, 1924.

1,495,361

UNITED STATES PATENT OFFICE.

HENRY ST. PIERRE, OF WORCESTER, MASSACHUSETTS, ASSIGNOR TO ST. PIERRE CHAIN CORPORATION, OF WORCESTER, MASSACHUSETTS, A CORPORATION OF MASSACHUSETTS.

ANTISKID DEVICE.

Application filed October 27, 1921. Serial No. 510,863.

*To all whom it may concern:*

Be it known that I, HENRY ST. PIERRE, a citizen of the United States, residing at Worcester, in the county of Worcester and State of Massachusetts, have invented a new and useful Antiskid Device, of which the following is a specification.

This invention relates to an anti-skid device for automobile tires, and has for its primary object to provide a device in which the tread members are so associated that movement of the device on the tires will be absolutely prevented, and besides increase the gripping action between the device and the ground, created upon the tendency of the tires to skid.

With these and other objects in view the invention will be better understood from the following detailed description taken in connection with the accompanying drawings, wherein.

Figure 1:
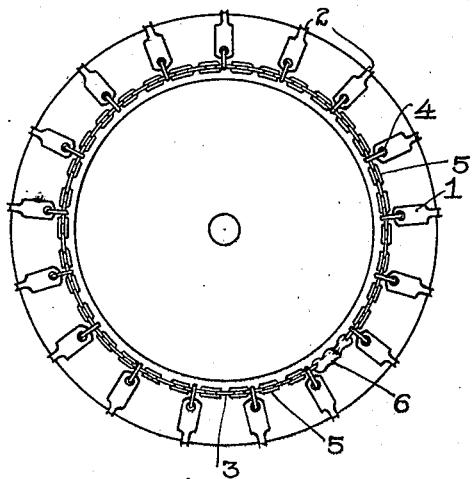
Fig. 1 is a side elevation of an automobile wheel with my invention applied thereto.
Figure 2:
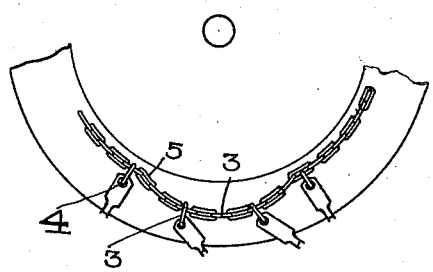
Fig. 2 is a similar view with two of the tread members in the position they assume when the tire tends to skid.
Figure 3:
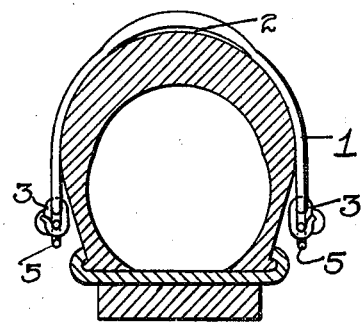
Fig. 3 is a cross section view through the tire.
Figure 4:
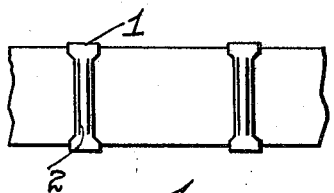
Fig. 4 is an edge view of a portion of the device.
Figure 5:
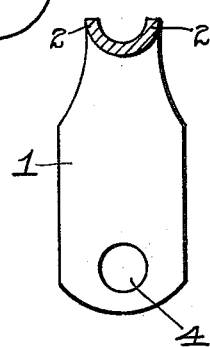
Fig. 5 is a cross section view of one of the members.

Again referring to the drawings illustrating the preferred one of the many forms in which the invention may be constructed a numeral 1 designates a plurality of tread members of arcuate shape so as to conform to the tread of the tire. The intermediate portion of each member is provided with radially extending flanges 2 for engagement with the ground. Links 3 flexibly connect openings 4 in the members with chains 5. By this arrangement as clearly shown in Fig. 2 of the drawings, the gripping effect between the members and the ground will be materially increased when the tire tends to skid, owing to the fact that the frictional engagement of the flanges with the ground will force the members in a direction to bring a greater portion of each member into engagement with the ground. It will also be noted that a portion of each chain 5 is forced out of its normal position which materially increases the pressure between the upper members and the tire thereby absolutely preventing slipping of the device on the tire. More specifically stated the action, in case of skidding, is that each forward radial flange when it engages the ground will tip over if the wheel starts to skid. This brings the forward side of the tread member down on the ground, as it swings over through an arc of about 90°. This affords additional resistance against skidding.

It will be seen that the tread members or traction elements 1 are concavo-convex throughout their length and regularly concavo-convex in transverse cross section, being regularly rounded on the under surface from one side to the other and throughout their length. Thus the apexes of the transverse concave and convex surfaces lie centrally and substantially on the longitudinal axis of each tread member. The central portion of the bight is formed with an abrupt curve so as to lie spaced from the central portion of the tread when fully inflated.

The clamp 6 enables me to quickly arrange the device in place and take up any slackness in the chain. I do not show or claim herein the details of this clamp as it is the subject of my Reissue Patent No. 15,511, dated Dec. 26, 1922. I do not claim anything in this patent that is claimed in my Patent No. 1,363,994, granted December 28, 1920.

Although I have illustrated and described only a single form of the invention I am aware of the fact that modifications can be made therein by any person skilled in the art without departing from the scope of the invention as expressed in the claims. Therefore, I do not wish to be limited to all the details of construction herein shown and described, but what I do claim is:—

1. As an article of manufacture, a traction element concavo-convex longitudinally, and concavo-convex in transverse cross section, the apex of said last mentioned convexity being on the longitudinal axis of said traction element and centrally of the sides.

2. As an article of manufacture, a traction element concavo-convex throughout its length, the under surface of said element being transversely rounded in regular manner from side to side of said element and throughout its length in such manner that the apex of the rounded under surface lies centrally of the sides and substantially on the longitudinal axis of said element.

3. An anti-skid device comprising a plurality of tread members of arcuate shape so as to conform to the tread of the tire having radial flanges for engagement with the ground, circumferential attaching chains loosely arranged on the tire, and links flexibly connecting said members with said chains, whereby the frictional engagement of the forward flange with the ground, in case of skidding, will act to swing said members over to bring substantially all the forward edge of each member into engagement with the ground and cause the members to lie between the tire and ground in a direction substantially at right angles to the normal position.

4. An anti-skid device comprising a plurality of tread members having flanges for engagement with the ground, circumferential attaching chains loosely arranged on the tire, and means for flexibly connecting said members with said chains, whereby the frictional engagement of the flanges with the ground, in case of skidding, will act to swing said members over and cause them to lie flat on the ground between the tire and ground in a direction substantially at right angles to the normal position.

5. An anti-skid device for a vehicle wheel tire comprising a plurality of tread members normally arranged substantially in radial position on the tire with their central portions extending across the same, and having front and rear spaced flanges normally located radially, and means for loosely connecting the opposite ends of said tread members to the tire, so that, in case of skidding, the tread members in contact with the ground will roll over under the tire to a position in which one of said flanges rests on the ground substantially throughout its length and the tire rests on the other to afford additional resistance against skidding.

6. A device of the character described comprising a plurality of metallic members disposed transversely upon a tire and flexibly connected, each of said members being of substantially U-shape with its arms engaging against the sides of the tire and having its middle portion curved for a portion of its length for conforming engagement with the tread of the tire and having the central portion of its bight formed with a more abrupt curve whereby to lie spaced from the central portion of the tread.

In testimony whereof I have hereunto affixed my signature.

HENRY ST. PIERRE.